Patented June 23, 1942

2,287,537

UNITED STATES PATENT OFFICE 2,287,537

PROCESS FOR THE PRODUCTION OF BETA-ALKOXYCARBOXYLIC ACIDS

Hermann Schulz, Neu-Isenburg, Frankfort-on-the-Main, Germany, assignor, by mesne assignments, to Chemical Marketing Company Inc., New York, N. Y.

No Drawing. Application May 10, 1939, Serial No. 272,851. In Germany May 19, 1938

10 Claims. (Cl. 260—530)

The present invention relates to a process for the production of beta-alkoxycarboxylic acids, and, more particularly, to a process for the production of beta-alkoxypropionic acids.

The production of acetic acid and its homologues by direct oxidation of the corresponding aldehydes is well-known to the art. However, it appeared to be extremely doubtful that similar results could be attained by oxidation of beta-alkoxyaldehydes. It has been known in the art that unsaturated aldehydes, such as acrolein, when treated with molecular oxygen, are subject to polymerization, and the reaction product obtained contains many very undesirable products, including polymers. Thus, in the case of beta-alkoxyaldehydes, it was not to be expected that the alkoxy group in the beta position would be stable enough to permit oxidation of beta-alkoxyaldehydes without the alkoxy groups splitting off. Rather was it to be expected that, in oxidizing beta-alkoxyaldehydes, a result similar to that found in the oxidation of unsaturated aldehydes would be obtained and that the formation of polymers or other undesirable products would result. So far as I am aware, the art has never been provided with a satisfactory process which can be conducted on an industrial scale for the production of commercially acceptable beta-alkoxycarboxylic acids with high yields in relatively simple apparatus.

It is an object of the present invention to produce beta-alkoxycarboxylic acids easily and cheaply by oxidizing beta-alkoxyaldehydes.

It is another object of the invention to produce beta-alkoxycarboxylic acids with substantially no formation of polymers or other undesirable products.

A further object of my invention is to treat beta-alkoxyaldehyes with molecular oxygen whereby beta-alkoxycarboxylic acids may be formed.

It is also within the contemplation of the invention to pass oxygen gas through beta-alkoxyaldehydes in the liquid phase whereby said beta-alkoxyaldehydes are almost completely converted into beta-alkoxycarboxylic acids.

My invention also contemplates the production of beta-alkoxypropionic acids by the oxidation of beta-alkoxypropionic aldehydes.

Furthermore, the present invention also provides a process of producing beta-ethoxypropionic acids which gives high yields without the formation of undesirable by-products.

Other objects and advantages of my invention become apparent from the following description of a preferred procedure for carrying it into practice.

Broadly stated, in carrying the present invention into practice, beta-alkoxycarboxylic acids are produced by oxidizing beta-alkoxyaldehydes. This is preferably done in the liquid phase and may advantageously be accomplished by treating beta-alkoxyaldehydes with molecular oxygen. I prefer to produce the beta-alkoxyaldehydes used as starting materials in my present invention by the process disclosed in my co-pending application, entitled "Process for the production of beta-alkoxyaldehydes," filed simultaneously with the present application. The reaction can be carried out in the presence of diluents or solvents. Fatty acids or substituted fatty acids, such as acetic acid, acetic anhydride, monochloroacetic acid, or butyric acid, for example, are suitable for this purpose, and beta-alkoxy fatty acids are particularly so.

It has been found that the rate of formation of the beta-alkoxycarboxylic acids is greatly accelerated by the presence of oxidation catalysts. In practicing my invention I have discovered that metals and metallic salts and compounds make very effective catalysts. For example, manganese, copper, cobalt, nickel and salts of these metals have all given good results. Thus, among other compounds, manganese acetate has been most successfully employed. Moreover, the addition of basic salts like sodium acetate, potassium acetate, etc., has proved to be advantageous, since they are adapted to buffer the pH of the reaction mixture.

Within the contemplation of the present invention, any beta-alkoxyaldehydes may be employed as starting materials. These include, for example, beta-ethoxypropionaldehyde, beta-ethoxyhydrocinnamaldehyde, beta-methoxy-alpha-methylpropionaldehyde, beta-ethoxyisovaleral, beta-methoxybutyraldehyde, beta-propoxypropionaldehyde, and the like. It is to be understood that the available beta-alkoxyaldehydes include the higher aldehydes as well as aldehydes having higher alkoxy groups in the beta position.

In accordance with the general principles of my invention, oxygen gas is bubbled through beta-ethoxypropionaldehyde in the presence of a solution of manganese acetate in a fatty acid. After a short period of time, say about two to five minutes, a brown color appears and the temperature, which tends to rise, must be maintained at a moderate temperature, say about 40° C., by cooling, whereby beta-ethoxypropionic acid is formed substantially without the formation of polymers. After the lapse of a considerable period of time, say in about two hours or more, the oxidation reaction ceases, and the beta-ethoxypropionic acid formed is recovered from the solution. Separation of the beta-ethoxypropionic acid may be effected by any conventional method, as will be readily understood by those skilled in the art. A satisfactory method of recovery is by fractional distillation under reduced pressure. A yield of about 90% of the theoretical yield is obtained.

For the purpose of giving those skilled in the art a better understanding of carrying my invention into practice, the following illustrative example is given:

*Example*

About 102 grams of beta-ethoxypropionaldehyde is mixed with a solution of about 2 grams of manganese acetate and about 25 grams of acetic acid. Oxygen is then caused to flow through this mixture by means of a suitable distribution apparatus. After about two to about five minutes the solution becomes colored an intensive sepia brown, and a spontaneous increase in temperature occurs. The reaction temperature is, however, maintained at about 40° C. by cooling. The reaction mixture takes up oxygen avidly, and after about two hours the theoretical amount of oxygen is used up. The reaction mixture is then rectified in vacuo, and the acetic acid goes off at about 30° C. under 10 mm. pressure. The beta-ethoxypropionic acid goes over at about 107 to 108° C., and about 106 grams are obtained. This 106 grams of beta-ethoxypropionic acid is about 90% of the yield theoretically obtainable. Under atmospheric pressure, beta-ethoxypropionic acid boils and decomposes at 216° C.

Although my invention has been described in connection with a preferred embodiment, it will be observed that variations may be resorted to and are within the purview of the appended claims. In the foregoing illustrative example, the production of beta-ethoxypropionic acid was described. Of course, other beta-alkoxycarboxylic acids can be produced by the following reaction and will have the following structural formula:

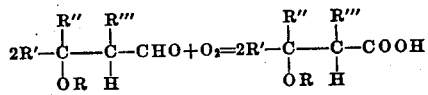

wherein R is an alkyl group and R', R'', and R''' are hydrogen atoms or organic radicals.

I claim:

1. The process of producing beta-ethoxypropionic acid which comprises establishing a mixture of beta-ethoxypropionaldehyde with about 2% of its weight of manganese acetate and about 25% of its weight of acetic acid, bubbling oxygen through said mixture over a period of about two hours to form a solution containing beta-ethoxypropionic acid, maintaining the temperature of said mixture at about 40° C. throughout the bubbling, and recovering said beta-ethoxypropionic acid by rectification in vacuo.

2. The process of producing beta-ethoxypropionic acid which comprises mixing beta-ethoxypropionaldehyde with a solution of manganese acetate in acetic acid, bubbling oxygen through this mixture to oxidize said beta-ethoxypropionaldehyde and to form a solution containing beta-ethoxypropionic acid, maintaining said solution at a temperature of the order of about 40° C. throughout, and rectifying said solution to recover beta-ethoxypropionic acid therefrom.

3. The process of producing beta-ethoxypropionic acid which comprises bubbling oxygen gas through a solution in an inert solvent containing beta-ethoxypropionaldehyde together with an oxidation catalyst and a basic salt to form a solution containing beta-ethoxypropionic acid, maintaining said solution at a temperature of the order of about 40° C. throughout, and removing beta-ethoxypropionic acid therefrom.

4. The process of producing beta-alkoxypropionic acids which comprises treating beta-alkoxypropionaldehydes in the liquid phase with molecular oxygen in the presence of a free carboxylic acid and an oxidation catalyst selected from the group consisting of compounds of manganese, copper, cobalt and nickel.

5. The process of producing beta-alkoxypropionic acids which comprises bubbling oxygen gas through a solution in an inert solvent containing beta-alkoxypropionaldehydes and an oxidation catalyst to form beta-alkoxypropionic acids, maintaining said solution at a temperature of about 40° C. throughout the oxidation, and removing beta-alkoxypropionic acids therefrom.

6. The process of producing beta-alkoxycarboxylic acids which comprises treating beta-alkoxyaldehydes with molecular oxygen in a liquid phase in the presence of an oxidation catalyst, a basic salt and an organic acid to form a solution containing beta-alkoxycarboxylic acids, cooling said solution throughout said oxidation to prevent polymerization of said beta-alkoxyaldehydes, and rectifying said solution to obtain beta-alkoxycarboxylic acids.

7. The process of producing beta-alkoxycarboxylic acids which comprises treating a solution containing beta-alkoxyaldehydes in an inert solvent with molecular oxygen in the presence of an oxidation catalyst whereby beta-alkoxycarboxylic acids are formed.

8. The process as set forth in claim 7 wherein the oxidation catalyst employed is a compound of a metal selected from the group consisting of manganese, copper, cobalt and nickel.

9. The process as set forth in claim 7 wherein the oxidation catalyst employed is a metallic salt.

10. The process of producing beta-alkoxycarboxylic acids which comprises oxidizing beta-alkoxyaldehydes in a liquid phase by treatment with molecular oxygen in the presence of an organic acid selected from the group consisting of fatty acids, substituted fatty acids and fatty acid anhydrides, whereby beta-alkoxycarboxylic acids are formed.

HERMANN SCHULZ.